(12) United States Patent
Pande et al.

(10) Patent No.: US 11,934,534 B2
(45) Date of Patent: Mar. 19, 2024

(54) VULNERABILITY ANALYSIS OF A COMPUTER DRIVER

(71) Applicant: Microsoft Technology Licensing, LLC, Redmond, WA (US)

(72) Inventors: Raghav Pande, Bellevue, WA (US); Jordan Josef Geurten, Redmond, WA (US); Danut Antoche-Albisor, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 17/537,386

(22) Filed: Nov. 29, 2021

(65) Prior Publication Data

US 2023/0169178 A1  Jun. 1, 2023

(51) Int. Cl.
| | | |
|---|---|---|
| G06F 21/57 | (2013.01) | |
| G06F 21/54 | (2013.01) | |
| G06F 21/56 | (2013.01) | |
| G06F 21/64 | (2013.01) | |

(52) U.S. Cl.
CPC ............ G06F 21/577 (2013.01); G06F 21/54 (2013.01); G06F 21/562 (2013.01); G06F 21/566 (2013.01); G06F 21/64 (2013.01)

(58) Field of Classification Search
CPC ...... G06F 21/577; G06F 21/54; G06F 21/562; G06F 21/566; G06F 21/64
See application file for complete search history.

(56) References Cited

U.S. PATENT DOCUMENTS

| | | | |
|---|---|---|---|
| 8,479,292 B1* | 7/2013 | Linhardt | H04L 63/1441 713/1 |
| 2012/0317645 A1* | 12/2012 | Fortier | G06F 21/566 726/24 |
| 2017/0213039 A1 | 7/2017 | Werner et al. | |
| 2019/0197234 A1 | 6/2019 | Harel et al. | |

(Continued)

OTHER PUBLICATIONS

Gu et al., Drip: A Framework for Purifying Trojaned Kernel Drivers, 2013. (Year: 2013).*

(Continued)

*Primary Examiner* — Trong H Nguyen
(74) *Attorney, Agent, or Firm* — Schwegman Lundberg & Woessner, P.A.

(57) ABSTRACT

Methods, systems, and computer programs are presented for analyzing a program to be executed on a computer to detect vulnerability for malicious attacks using the program. One method includes an operation for performing dynamic vulnerability detection of a driver when the driver is loaded in a computing system. The dynamic vulnerability detection comprises detecting at least one offset made available by the driver for access to the driver, and detecting application programming interface (API) calls made by the driver. Further, the method includes performing static vulnerability detection of the driver by analyzing binary code of the driver. The static vulnerability detection comprises determining the at least one offset available for access to the driver, and identifying vulnerable code paths to functions accessing kernel functionality. Further, the method includes an operation for determining if the driver is vulnerable based on results from the dynamic vulnerability detection and the static vulnerability detection.

19 Claims, 8 Drawing Sheets

(56) References Cited

U.S. PATENT DOCUMENTS

2020/0380127 A1   12/2020   Das et al.
2020/0394311 A1   12/2020   Li et al.

OTHER PUBLICATIONS

Kuznetsov et al., Testing Closed-Source Binary Device Drivers with DDT, 2010. (Year: 2010).*

Ball et al., Thorough Static Analysis of Device Drivers, 2006. (Year: 2006).*

"International Search Report issued in PCT Application No. PCT/US2022/048524", dated Mar. 6, 2023, 13 Pages.

"Secured-Core Pcs: A Brief Showcase of Chip-To-Cloud Security Against Kernel Attacks", Retrieved from: https://www.microsoft.com/en-us/security/blog/2020/03/17/secured-core-pcs-a-brief-showcase-of-chip-to-cloud-security-against-kernel-attacks/, Mar. 17, 2020, 8 Pages.

Bicchierai, Lorenzo F., "Hackers Tricked Microsoft Into Certifying Malware That Could Spy on Users", Retrieved from: https://www.vice.com/en/article/pkbzxv/hackers-tricked-microsoft-into-certifying-malware-that-could-spy-on-users, Jun. 28, 2021, 35 Pages.

Cable, John, "Introducing the next feature update to Windows 10: 21H2", Retrieved from: https://blogs.windows.com/windowsexperience/2021/07/15/introducing-the-next-feature-update-to-windows-10-21h2/, Jul. 15, 2021, 4 Pages.

Hahn, Karsten, "Microsoft Signed a Malicious Netfilter Rootkit", Retrieved from: https://www.gdatasoftware.com/blog/microsoft-signed-a-malicious-netfilter-rootkit, Jun. 25, 2021, 6 Pages.

Lakshmanan, Ravie, "Hackers Trick Microsoft Into Signing Netfilter Driver Loaded With Rootkit Malware", Retrieved from: https://thehackernews.com/2021/06/hackers-trick-microsoft-into-signing.html, Jun. 28, 2021, 4 Pages.

"ASRock Drivers—Privilege Escalation", Retrieved from: https://web.archive.org/web/20201207080720/https://www.exploit-db.com/exploits/45716, Dec. 7, 2020, 9 Pages.

"ASUS Drivers Elevation of Privilege Vulnerabilities", Retrieved from: https://web.archive.org/web/20201108020232/ https://www.secureauth.com/labs/asus-drivers-elevation-of-privilege-vulnerabilities/, Dec. 18, 2018, 10 Pages.

"CVE-2018-19320", Retrieved from: https://cve.mitre.org/cgi-bin/cvename.cgi?name=2018-19320, Nov. 16, 2018, 2 Pages.

"CVE-2020-12928 Exploit Proof-of-Concept, Privilege Escalation in AMD Ryzen Master AMDRyzenMasterDriver.sys", Retrieved from: https://h0mbre.github.io/RyzenMaster_CVE/#, Oct. 13, 2020, 25 Pages.

"DriveCrypt", Retrieved from: https://web.archive.org/web/20180307085522/https://github.com/shjalayeri/DriveCrypt/, Mar. 7, 2018, 1 Page.

"Gigabyte Drivers Elevation of Privilege Vulnerabilities", Retrieved from: https://web.archive.org/web/20200221023904/https://www.secureauth.com/labs/advisories/gigabyte-drivers-elevation-privilege-vulnerabilities, Dec. 18, 2018, 12 Pages.

"McAfee Data Loss Prevention Endpoint—Arbitrary Write Privilege Escalation", Retrieved from: https://web.archive.org/web/20150202022156/https://www.exploit-db.com/exploits/35953/, Jan. 30, 2015, 4 Pages.

"Submit a Driver for Analysis", Retrieved from: https://www.microsoft.com/en-us/wdsi/driversubmission, Retrieved on: Mar. 8, 2022, 2 Pages.

Anwar, Parvez, "AVG Internet Security 2015 Arbitrary Write Privilege Escalation", Retrieved from: https://web.archive.org/web/20150206131720/https://www.exploit-db.com/exploits/35993/, Feb. 4, 2015, 5 Pages.

Anwar, Parvez, "BullGuard Multiple Products Arbitrary Write Privilege Escalation", Retrieved from: https://web.archive.org/web/20150206131726/https://www.exploit-db.com/exploits/35994/, Feb. 4, 2015, 4 Pages.

Anwar, Parvez, "K7 Computing Multiple Products Arbitrary Write Privilege Escalation", Retrieved from: https://web.archive.org/web/20150206131706/https://www.exploit-db.com/exploits/35992, Feb. 4, 2015, 4 Pages.

Anwar, Parvez, "Symantec Altiris Agent 6.9 (Build 648)—Privilege Escalation", Retrieved from: https://web.archive.org/web/20150214003132/https://www.exploit-db.com/exploits/35964/, Feb. 1, 2015, 5 Pages.

Anwar, Parvez, "Trend Micro Multiple Products 8.0.1133—Privilege Escalation", Retrieved from: https://web.archive.org/web/20150214003127/https://www.exploit-db.com/exploits/35962/, Jan. 31, 2015, 4 Pages.

Firozi, Meysam, "Win10Pcap-Exploit", Retrieved from: https://github.com/Rootkitsmm-zz/Win10Pcap-Exploit, Oct. 16, 2015, 3 Pages.

Memelli, Matteo, "Avast! 4.7 aavmker4.sys privilege escalation", Retrieved from: https://web.archive.org/web/20100429061604/https://www.exploit-db.com/exploits/12406/, Apr. 27, 2010, 4 Pages.

Michael, Jesse, "Screwed-Drivers", Retrieved from: https://github.com/eclypsium/Screwed-Drivers/blob/master/DRIVERS.md, Oct. 18, 2019, 3 Pages.

Namazso, "Physmem Drivers", Retrieved from: https://github.com/namazso/physmem_drivers, Jun. 16, 2019, 6 Pages.

Oleksiuk, Dmytro, "Exploiting SMM Callout Vulnerabilities in Lenovo Firmware", Retrieved from: http://blog.cr4.sh/2016_02_01_archive.html, Feb. 24, 2016, 26 Pages.

Sutherland, Graham, "ASUS UEFI Update Driver Physical Memory Read/Write", Retrieved from: https://codeinsecurity.wordpress.com/2016/06/12/asus-uefi-update-driver-physical-memory-readwrite/, Jun. 12, 2016, 13 Pages.

Demirkapi, Bill, "How to use Trend Micro's Rootkit Remover to Install a Rootkit", Retrieved from: https://web.archive.org/web/20210303153029/https://billdemirkapi.me/how-to-use-trend-micros-rootkit-remover-to-install-a-rootkit/, May 18, 2020, 30 Pages.

"Attack Surface Reduction Rules Reference", Retrieved from: https://docs.microsoft.com/en-us/microsoft-365/security/defender-endpoint/attack-surface-reduction-rules-reference?view=o365-worldwide#block-abuse-of-exploited-vulnerable-signed-drivers, Feb. 26, 2022, 20 Pages.

* cited by examiner

VULNERABILITY ANALYSIS OF A COMPUTER DRIVER

TECHNICAL FIELD

The subject matter disclosed herein generally relates to methods, systems, and machine-readable storage media for analyzing a program to be executed on a computer to detect vulnerability for malicious attacks using the program.

BACKGROUND

Users want to execute computer programs in their computer systems that are safe, especially against attacks to the computer systems used by malicious attackers by leveraging the use of these computer programs. One example is the use of drivers used to interface the user with some utility, such as peripherals of the computer system. The operating system (OS) provider for the computer system wants to make sure that the authorized drivers to be executed on the OS are safe and can not be leveraged for improper use.

The OS provider can perform certain tests on the drivers, such as scanning for virus and performing tests for compatibility with the hardware. However, these tests are not enough to protect the user, even when the driver manufacturer acts in good faith and the driver is considered safe.

Computer drivers have been used by malicious users to access forbidden resources of the computer system and elevate their privilege level, even though the drivers may have not been designed for this purpose. These drivers are considered to be vulnerable for unauthorized activities.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to analyzing a program to be executed on a computer to detect vulnerability for malicious attacks using the program. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Some driver security tools include antivirus or malware scanning of the program code to identify signatures that have been found to be dangerous. But these tools are not enough to detect if the program is vulnerable to be used by a user to access unauthorized resources of the computer, such as the kernel, OS memory space, or other protected areas of memory. This can be used by the user to elevate their privilege level in the OS.

In one aspect, a program, such as a driver for a computer, is analyzed to detect security vulnerability, a process that is referred to as vulnerability detection. The program is analyzed dynamically and statically. Dynamic analysis is performed by loading the program and examining its behavior. Static analysis is performed by using several tools to determine properties of the program code that can allow users of the program to obtain access to unauthorized computer resources. The results of the dynamic and static analysis are combined to provide a vulnerability score for the program. In some example embodiments, the vulnerability score may be used to stop a driver from being loaded in the computer system, or to disable a driver already installed in the computer system.

Although embodiments are presented with reference to drivers being installed by an operating system, the same principles may be applied to any type of computer program to be executed on a computing system.

One general aspect includes a method that includes an operation for performing dynamic vulnerability detection of a driver while the driver is executing in a computing system. The dynamic vulnerability detection comprises detecting at least one driver address offset made available by the driver for access to the driver and detecting application programming interface (API) calls made by the driver. Further, the method includes performing static vulnerability detection of the driver by analyzing binary code of the driver. The static vulnerability detection comprises determining the at least one driver address offset available for access to the driver and identifying vulnerable code paths to functions accessing kernel functionality. Further, the method includes an operation for determining if the driver is vulnerable based on results from the dynamic vulnerability detection and the static vulnerability detection.

Figure 1:
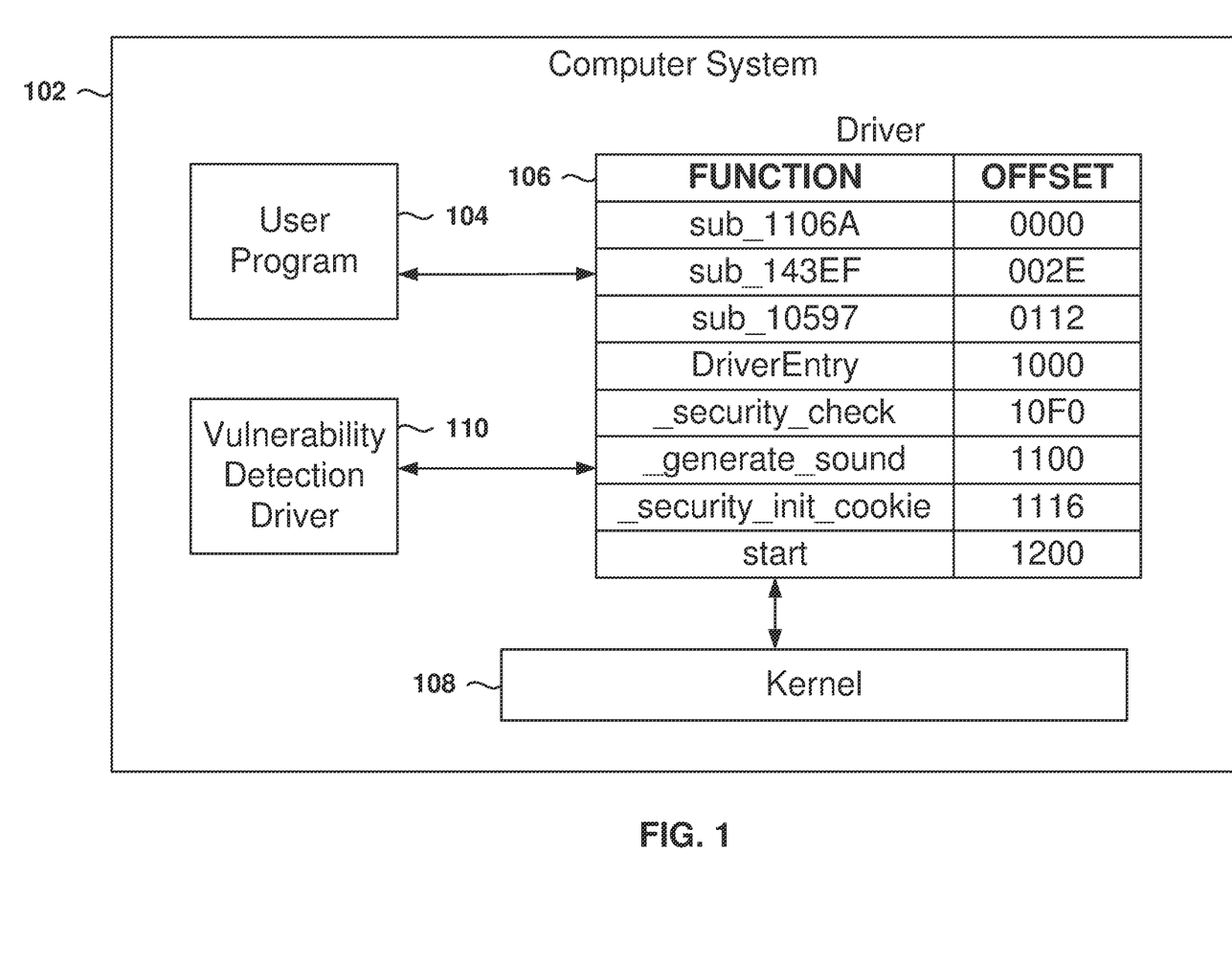
FIG. 1 illustrates the use of a driver within a computer system, according to some example embodiments.

FIG. 1 illustrates the use of a driver 106 within a computer system 102, according to some example embodiments. The computer system 102 includes a kernel 108 that provides the functions of the operating system, such as interfacing with peripherals and other components of the computer system.

Once the driver 106 is installed in the computer system 102, a user program 104, also executing on the computer system, may access the driver 106 to obtain some functionality. For example, the user program 104 may request the driver 106 to generate a beep sound on the speakers of the computer system 102.

Typically, the user program 104 does not have direct access to the speakers, so the driver 106 provides functionality to access the speakers. The driver 106 is able to access the kernel 108 and knows how to perform the desired function on the particular hardware of the computer system 102.

The driver 106 has an address in memory and the user program 104 uses that address to invoke the driver. Oftentimes, the function provided by the driver is invoked by calling the base address of the driver plus a particular offset. That is, the offset is a numerical value that is added to the base address of the driver 106 to invoke a particular function of the driver 106. Therefore, the user must know the offset within the driver 106 to make the call to the driver 106. These offsets are also referred to as handlers or user-mode handlers.

The driver 106 may provide one or more functions, and each function may be invoked at a different offset. In the illustrated example of FIG. 1, the driver 106 includes eight different functions, and each function is associated with a different offset. For example, the function _generate_sound to play a sound on the speakers is at offset $1100_{hex}$, so the user program 104 will call the driver with its base address plus offset $1100_{hex}$ to generate the beep on the speakers.

However, malicious users may exploit vulnerabilities of the driver 106 to perform illegal activities, such as accessing unauthorized memory areas managed by the kernel 108. The driver creator may not have the intention to allow the unauthorized use, but the malicious attacker may find a vulnerable spot in the driver. A detail example is provided below with reference to FIG. 2.

It is typical for OS providers, such as Microsoft for Windows OS®, to test drivers before the drivers are authorized to be loaded on the OS. The testing may include signature matching of the code to search for known viruses or exploits. However, these tools are not enough to determine if a driver may have the potential to be used in a way that allows a user program 104 perform unauthorized activities, such as accessing OS memory or raising the privilege level of the user program 104 in the computer system.

One technique for vulnerability detection is fuzz testing, also referred to as fuzzing, which is a process used by security researchers and adversaries to manually or automatically scan the driver binary for vulnerabilities by sending random input to a driver's user mode data handlers with the intention to discover a bug or a vulnerability. The bug could manifest as memory corruption or kernel crash, memory leaks or controllable unintended behaviors (for example, reading/writing physical memory from user mode). While fuzzing techniques have become more automated overtime, this approach still requires significant manual intervention and requires significant time to yield a complete enumeration of the vulnerable functions and parameters leading to vulnerable code paths.

Further, malware scanning by anti-malware engines is another means of detecting malicious behaviors in driver binaries. Anti-malware and anti-virus engines scan driver binaries for malicious signatures against a list of known bad behavior in the anti-malware engines and databases. Signature scanning is an effective means of flagging malware but requires regular updates of definitions and prior malware samples. Further, anti-malware engines can also use heuristics to quantify the likelihood that a file is malware.

Embodiments presented herein provide tools for vulnerability detection to detect if the driver 106 has the potential to let the user program 104 perform unauthorized activities. By testing drivers for vulnerabilities, the OS provider is able to guarantee users of the OS that the drivers are safe to install in their systems.

In some example embodiments, a vulnerability detection driver 110 is installed to assist in the vulnerability detection. The vulnerability detection driver 110 examines the driver to determine the available offsets provided by the driver. More details are provided below with reference to FIGS. 3 and 4.

As described in more detail below, using symbolic execution and code emulation, vulnerability detection can identify data handlers in a driver code responsible for handling user-mode data requests and determine whether execution of these suspicious or highly privileged code paths is possible from the user mode. Additionally, vulnerability detection scans and identifies interesting and unusual code patterns which can indicate the presence of a vulnerable, vulnerable-by-design, or malicious driver, and determine whether those paths are reachable from either user mode or the driver itself.

Vulnerability detection provides identification of vulnerable code paths in the driver (e.g., identification of all the functional boundaries, detection of the vulnerable code paths), exploitability of the vulnerable code path from user mode (e.g., reachability/access to the code path possible from user mode, symbolic execution, emulation of the code), and identification of interesting and unusual code patterns.

Figure 2:
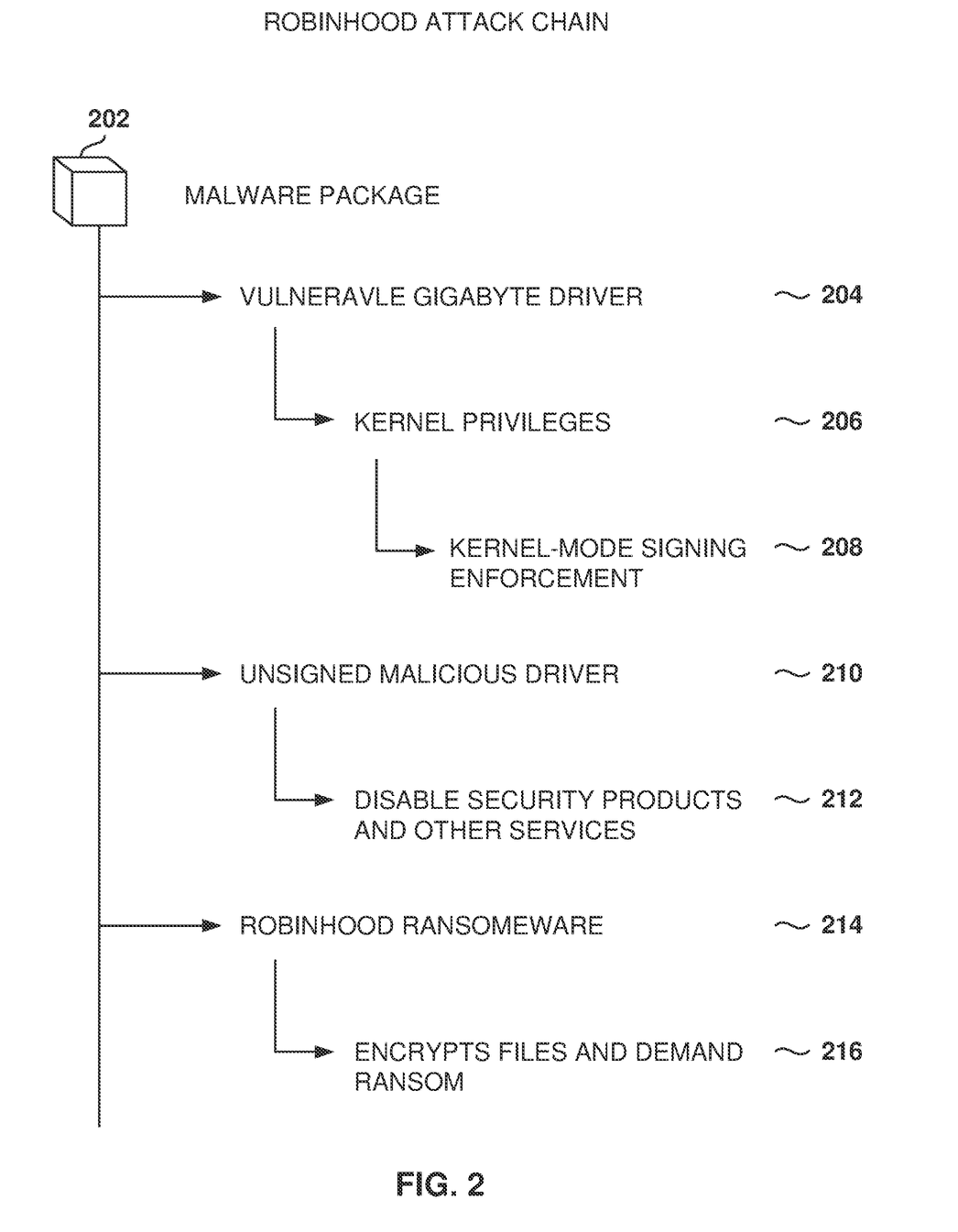
FIG. 2 illustrates an example of the exploitation of a vulnerable driver for implementing a malicious attack on the computer system.

FIG. 2 illustrates an example of the exploitation of a vulnerable driver for implementing a malicious attack on the computer system. The example is for the Robinhood ransomware attack that leverages the vulnerability of an existing driver.

For example, a malware package 202 is based on a gigabyte driver 204 GDRV.sis used for a gigabyte app center, to manage some functionality of the CPU, such as control the fan speed or turn on an LED.

This driver 204 allows a memory copy function for a user mode, which enables the user mode to send in a large buffer to the kernel mode. But by overflowing the buffer, the user mode is able to gain kernel privileges 206, such as kernel-mode signing enforcement 208 for security operations.

This means that he user mode can gain code execution in the kernel, which was not the intention of the maker of the driver 204. Once the user mode access kernel privileges 206, the unsigned malicious user 210 is able to disable security products and other services 212.

Once the security is disable, the malicious user can do a ransomware operation 214 by encrypting files of the computer system and demanding ransom 216.

Figure 3:
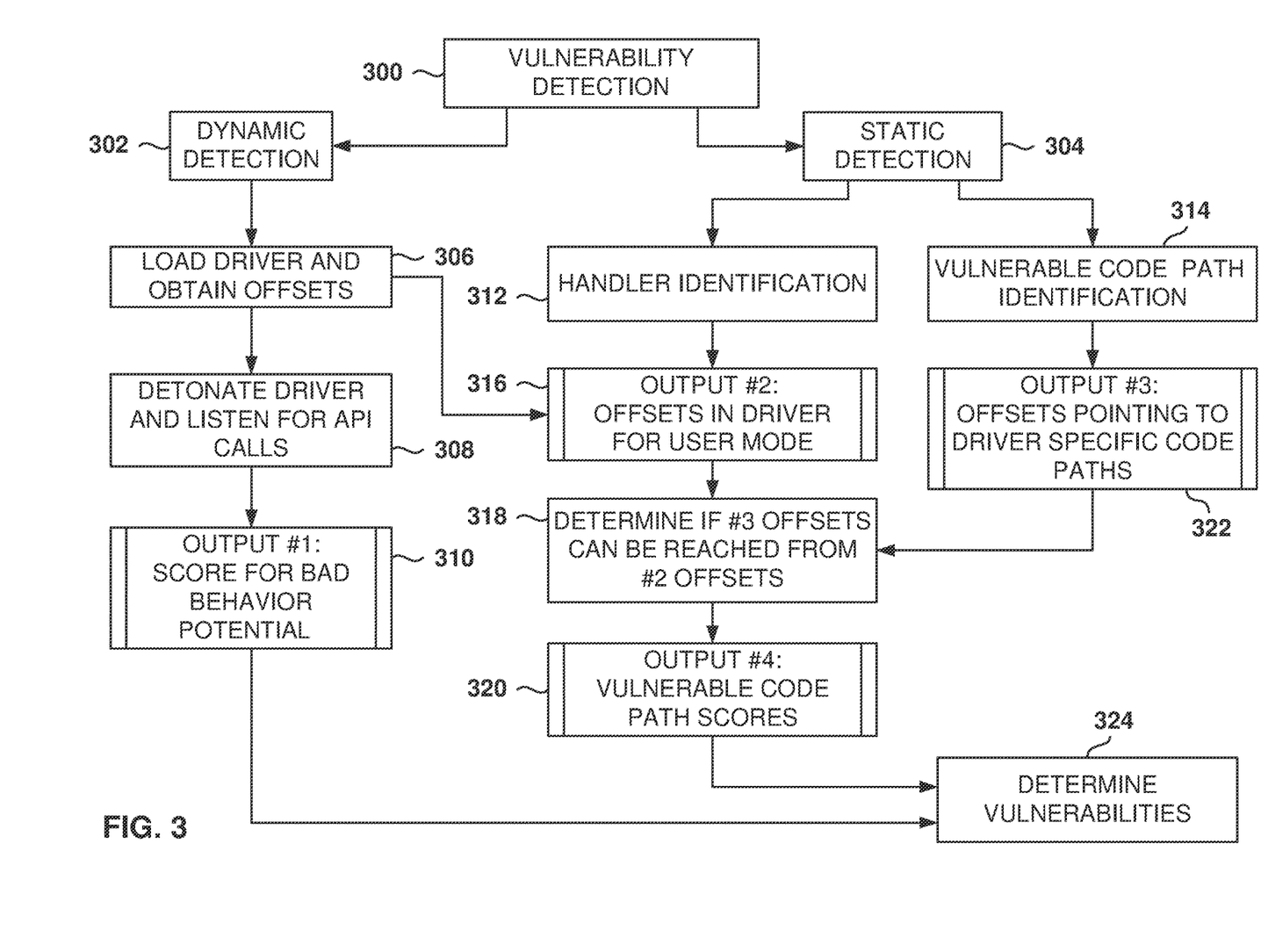
FIG. 3 is a flowchart of a method for vulnerability detection, according to some example embodiments.

FIG. 3 is a flowchart of a method for vulnerability detection 300, according to some example embodiments. While the various operations in this flowchart are presented and described sequentially, one of ordinary skill will appreciate that some or all of the operations may be executed in a different order, be combined or omitted, or be executed in parallel.

The vulnerability detection 300 includes a dynamic detection 302 and static detection 304. The dynamic detection 302 involves analyzing the behavior of the driver when the driver is installed in a computer system. The static detection 304 involves analyzing the code of the driver to find potential vulnerabilities, that is, with static detection 304, the driver need not be executed on a computer system.

During dynamic detection 302, the driver is loaded, and the offsets of the driver are obtained at operation 306. For example, the driver may be loaded on a virtual machine, but other computing systems may also be utilized.

Further, at operation 308, the driver is detonated (e.g., invoked or executed), and the vulnerability detection listens for API calls performed by the driver. The result is output #1, which is a score for bad behavior potential. More details for the dynamic detection are provided below with reference to FIG. 4.

Static detection 304 includes handler identification 312 and vulnerable-code-path identification 314. More details about the handler identification operation are provided below with reference to FIG. 5. The result of handler identification 312 is output #2 which includes the offsets of the driver available for user mode. These offsets are combined with the offsets obtained during dynamic detection at operation 306.

The vulnerable-code-path identification 314 detects paths in the code of the driver that may be vulnerable. The result is output #3 with a list of offsets pointing to driver-specific code paths. More details about vulnerable-code-path identification 314 are provided below with reference to FIG. 6.

Figure 4:
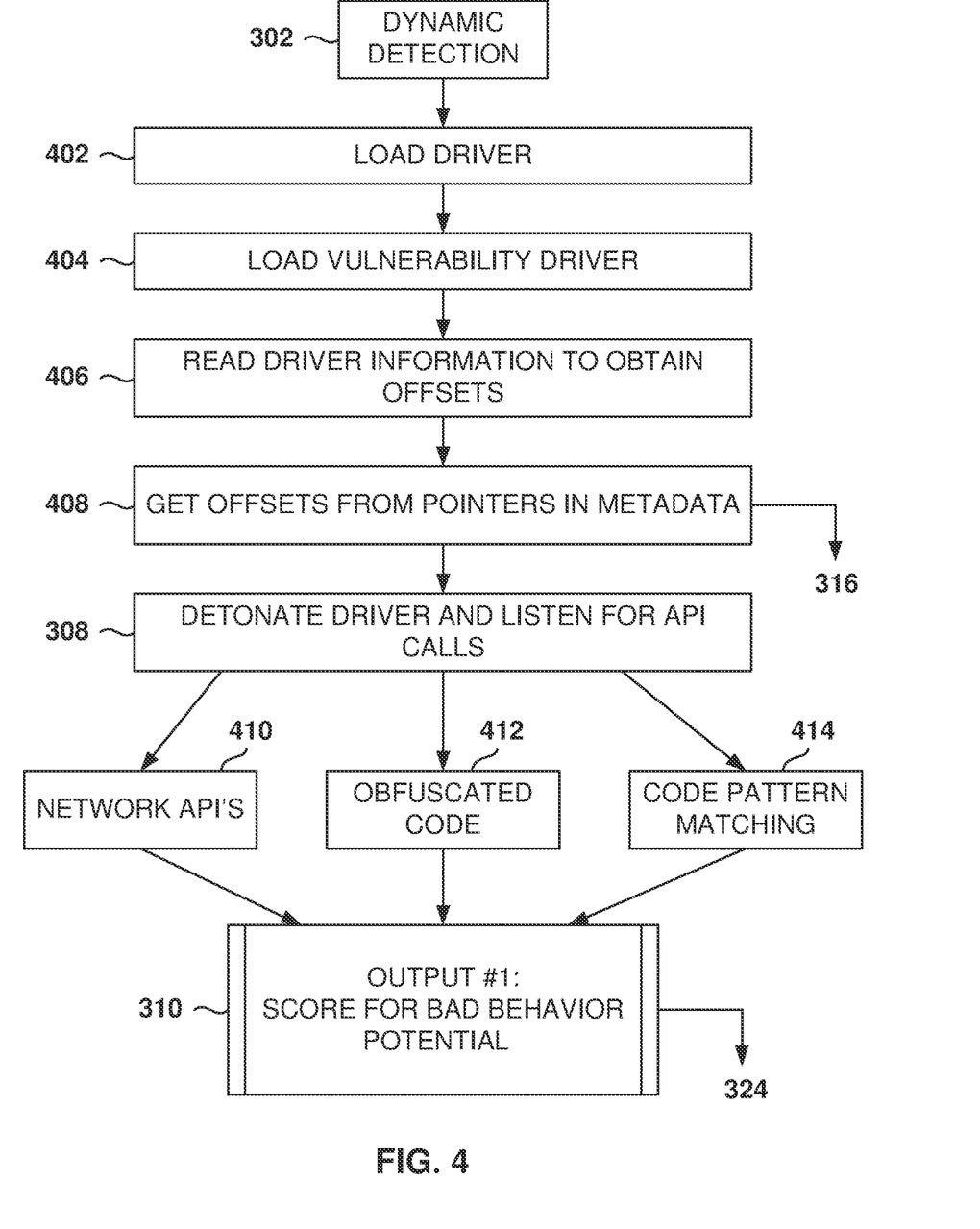
FIG. 4 is a flowchart detailing the dynamic detection of the vulnerability analysis, according to some example embodiments.

FIG. 4 is a flowchart detailing the dynamic detection 302 of the vulnerability detection 300, according to some example embodiments. At operation 402, the driver to be scanned for vulnerabilities is loaded on the computer system 102. Further, at operation 404, the vulnerability detection driver 110 is installed in the computer system 102.

At operation 406, the vulnerability detection driver reads memory to obtain the driver information, which includes the offsets provided by the driver to access the different driver functions. These offsets are part of the metadata associated with the driver.

At operation 408, the vulnerability detection driver gets the offsets from the pointers in the metadata. For example, the vulnerability detection driver captures IRP_MJ_CONTROL offsets from the driver metadata, and from the pointers in the metadata (e.g., Driver_object structure in the kernel), the vulnerability detection driver gets the handlers that identify the offsets. The metadata is in the kernel space. The IRP_MJ_CONTROL offsets will be responsible for pointing out to the kernel that, when the user mode calls in this driver to act as a broker, the IRP_MJ_CONTROL offsets are used for the driver communications.

The offset information is made available for output #2 316. In some example embodiments, the data includes an array of driver offsets, which are the offsets to be used to determine vulnerabilities (operations 318 and 324).

Operation 308 is for detonating the driver and listening for API calls made by the driver. The API calls are intercepted by the vulnerability detection driver. The vulnerability detection driver listens for specific events associated with the driver and logs the operations associated with the driver functionality. Some of the operations include process creation, thread creation, access to another process, API calls made by the driver, etc.

At operation 410, the vulnerability detection driver checks for network API calls made by the driver, that is, detect if the driver wants to communicate over the network. For example, the WSK framework has a function table pointer (similar to that Windows Driver Framework (WDF) function pointer table) to identify in the network connection is made.

WDF is a set of Microsoft tools and libraries that aid in the creation of device drivers for Windows 2000 and later versions of Windows. It complements Windows Driver Model (WDM), abstracting away much of the boilerplate complexity in writing Windows drivers. WDF consists of Kernel-Mode Driver Framework (KMDF) and User-Mode Driver Framework (UMDF). These individual frameworks provide an object-oriented programming model for Windows driver development.

At operation 412, a check is made of the existence of obfuscated code. Obfuscation is the deliberate act of creating source or machine code that is difficult for humans to understand. Like obfuscation in natural language, code obfuscation may use needlessly roundabout expressions to compose statements. Programmers may deliberately obfuscate code to conceal its purpose (security through obscurity), the program logic, or implicit values embedded within the code in order to prevent tampering or to deter reverse engineering.

Some of the techniques for detecting obfuscated code include measuring entropy in the code (e.g., measuring randomness in the code), control-flow flattening, search for opaque predicates, and spaghetti jumps. Further, at operation 414, a search for code-pattern matching to known malicious code patterns is performed. It is noted that the patterns in the code change over time, so the patterns are judged in the dynamic system when the driver is detonated. The results are used in the static detection also.

The results of operations 410, 412, and 414 are combined, at operation 310, to obtain output #1, which is a score for potential bad behavior by the user mode. Each of the operations 410, 412, and 414 provide a respective score, and the final score is a combination, such as a straight sum, a weighted sum, a minimum function, a maximum function, a polynomial combination, etc., or a combination thereof. The output #1 is then used at operation 324 for the vulnerability determination.

Figure 5:
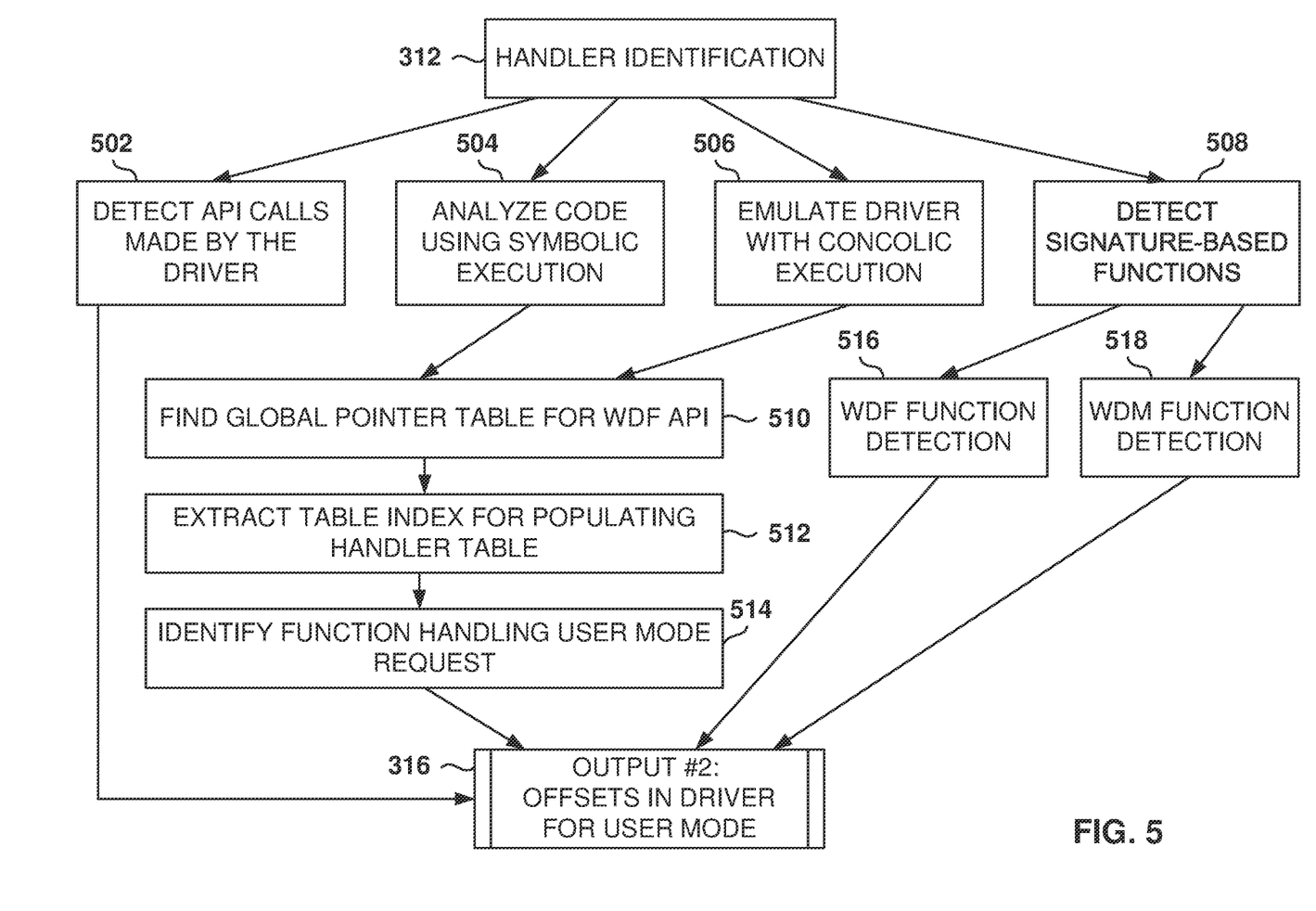
FIG. 5 is a flowchart detailing the handler identification that is part of the static detection, according to some example embodiments.

FIG. 5 is a flowchart detailing the handler identification 312 that is part of the static detection 304, according to some example embodiments. During dynamic detection, it is possible that the driver delays the presentation of its handling, so the dynamic detection may not be able to detect the offsets in time. The static detection complements the dynamic detection by using other techniques to identify the offsets for the driver.

The purpose of the handler identification 312 is to find create, read, and write handlers (i.e., offsets) that are accessible from user mode by analyzing the driver binary code. The create handler is a handler available to the user mode for creating the instance of the driver. The read handler is for reading data by the user mode, and the write handler is for writing data by the user mode. Other embodiments may use additional handlers, and the same principles presented herein may be utilized to analyze the creation of additional handlers that may create vulnerabilities in the driver.

In some example embodiments, there are four operations for handler identification: detecting API calls made by the driver 502, analyzing coded using symbolic execution 504, emulating the driver with concolic execution 506, and detecting signature-based functions 508.

Operation 502 is for detecting API calls made by the driver. One method includes reading the driver's import table, which shows, by examination of the code, that the driver wants to perform this specific activity in the system via the API call.

In some example embodiments, the detection of the API calls is performed using an open-source tool called Radare2, but other tools may also be used. Radare2 is a framework for reverse-engineering and analyzing binaries, composed of a set of utilities, and is built around a disassembler for computer software which generates assembly language source code from machine-executable code.

During operation 502, the static import table, in the PE header of the target driver, is read. Further, the "interesting" imports are cross-referenced with the code that invokes them. An interesting import would be responsible for attaching metadata to the kernel. There are some imports that allow the user mode to attach the user handler to a specific driver metadata. Thus, a driver in itself has a piece of data set, which is empty when it is first initialized. Eventually, as the driver code is executed, its preamble is supposed to set up the handler, which notifies the kernel that when the user mode asserts "I need to call this driver", the driver has to be contacted at this offset defined by the handler. The APIs can be of many kinds, such as IO create device, and the list of APIs may grow over time.

For example, there could be a driver that is heavily abstracted, not written in a base level. The driver has to use certain APIs or imports in order to announce that this is my handler. The API call is identified and then the vulnerability detection backtracks from there to determine that this is the handler that the driver is registering. In some cases, this is not a deterministic operation, and probabilities are assigned to the possibility of the offset being associated with the API call.

At operation 504, the driver code is analyzed using symbolic execution, which is a method for analyzing a program to determine what inputs cause each part of a program to execute. An interpreter follows the program assuming symbolic values for inputs rather than obtaining actual inputs as normal execution of the program would. The symbolic execution arrives at expressions in terms of those symbols for expressions and variables in the program, and constraints in terms of those symbols for the possible outcomes of each conditional branch. Finally, the possible inputs that trigger a branch can be determined by solving the constraints. Thus, symbolic execution purpose is to execute the code symbolically by assigning symbolic values to determine where each section of code branches to other sections of the code.

In some example embodiments, the tool Angr is used, but other tools may also be utilized. Angr is a python framework for analyzing binaries that combines static and dynamic symbolic analysis. The tool provides several features, such as disassembly and intermediate-representation lifting, program instrumentation, symbolic execution, control-flow analysis, data-dependency analysis, value-set analysis (VSA), and decompilation.

The symbolic execution determines which attributes are being set (e.g., DEVICE_OBJECT-CHARACTERISTICS, which is a data structure of the Driver_Object structure). These attributes provide the offsets to the handlers. Thus, when the driver's code writes the driver object characteristics, the symbolic execution determines the value for the attributes that are being written, in a way, intercepting the code inside the emulation.

At operation 506, the driver is emulated using concolic execution. Concolic testing is a hybrid software verification technique that performs symbolic execution along a concrete execution path (e.g., testing on particular inputs). Typically, concolic execution is used for finding bugs in software rather than demonstrating program correctness.

The results from symbolic execution and concolic execution are used at operation 510 to find the global pointer table for the WDF API. Some drivers (e.g., WDF drivers) provide an abstracted code that can not be parsed because the code requires a runtime component in the kernel. These drivers are hard to analyze statically. With a combination of symbolic and concolic execution, the bind information data structure is parsed to identify a global function pointer table for WDF API.

A driver may have to call some APIs, and these APIs are invoked inside normal drivers and WDF drivers. In the normal drivers, these APIs provide an exact estimate of what is happening, that is, the APIs being called. However, in the WDF drivers, these APIs provide a table of all the functions, or a different set of APIs that the driver can call, and the driver will have offsets to those APIs. In a way, it is searching nested metadata, or searching with a level of indirection.

At operation 512, the table index is extracted for populating the handler table (e.g., EvtIoDeviceControl). After identifying the API responsible for setting the WDF function table, the index for EVT IO device control is identified. This index is responsible for setting the metadata. That is, with WDT, the metadata is not directly set in one step, but in two steps, with the extra nesting step via the WDF API function table.

The goal is to correlate that index table with WDF APIs, that are being called from the driver, to extract a target function that is responsible for handling the user remote code requests. When the index to EVT IO device control is obtained, the driver code is examined to identify which code is calling this specific index, instead of calling an API as described above.

At operation 514, the index table integers are correlated with the WDF APIs being called from the driver to identify the target function that is responsible for handling the user mode request. The result is used for output #2 316.

The fourth method for handler identification is detecting signature-based functions 508. Sometimes symbolic execution 504 and concolic execution 506 may fail for many reasons, e.g., reading API calls are obfuscated. In these cases, signature-based function detection can help identifying the handlers.

In the driver code, functions define blocks of the code. It is possible to identify a block signature, but sometimes it is not known what the blocks look like. However, a semantic analysis of these function blocks can identify these functions.

In some example embodiments, signature-based function detection 508 includes the following operations: identifying functions in the driver, examining the functional definitions of the blocks, and finding the user mode connection (e.g., IRP_MJ_CONTROL). In some example embodiments the tool Radare2 may be used, but other tools may also be used.

The user mode access can be via WDF or WDM drivers. Operation 516 is for WDF function detection, and operation 518 is for WDM function detection. Inside a function space, the blocks can be sequential or be out of order, but if it is known where a function starts, then the prologue, the initial bytes of the function, can be examined to determine how the function requires input parameters. This way, it is possible to determine if the driver is WDF or WDM. Once the functions are identified, the handlers are the identified functions.

For WDF, the handler definition is as follows:
VOID TestKmdfDriverEvtIoDeviceControl(_In_ WDFQUEUE Queue, _In_ WDFREQUEST Request, _In_ size_t OutputBufferLength, _In_ size_t InputBufferLength, _In_ ULONG IoControlCode)

For WDM, the handler definition is as follows:
_int64_fastcall Driver_IRP_MJ_DEVICE_CONTROL (DEVICE_OBJECT*DeviceObject, IRP*Irp)

The function definition may be obfuscated, but in the end it will have to follow the corresponding syntax. Thus, it is possible to make a determination that a function block is a handler.

The output #2 316 is the result of combining the results obtained at operations 514, 516, and 518, which a list of offsets in the driver available to the user mode.

Figure 6:
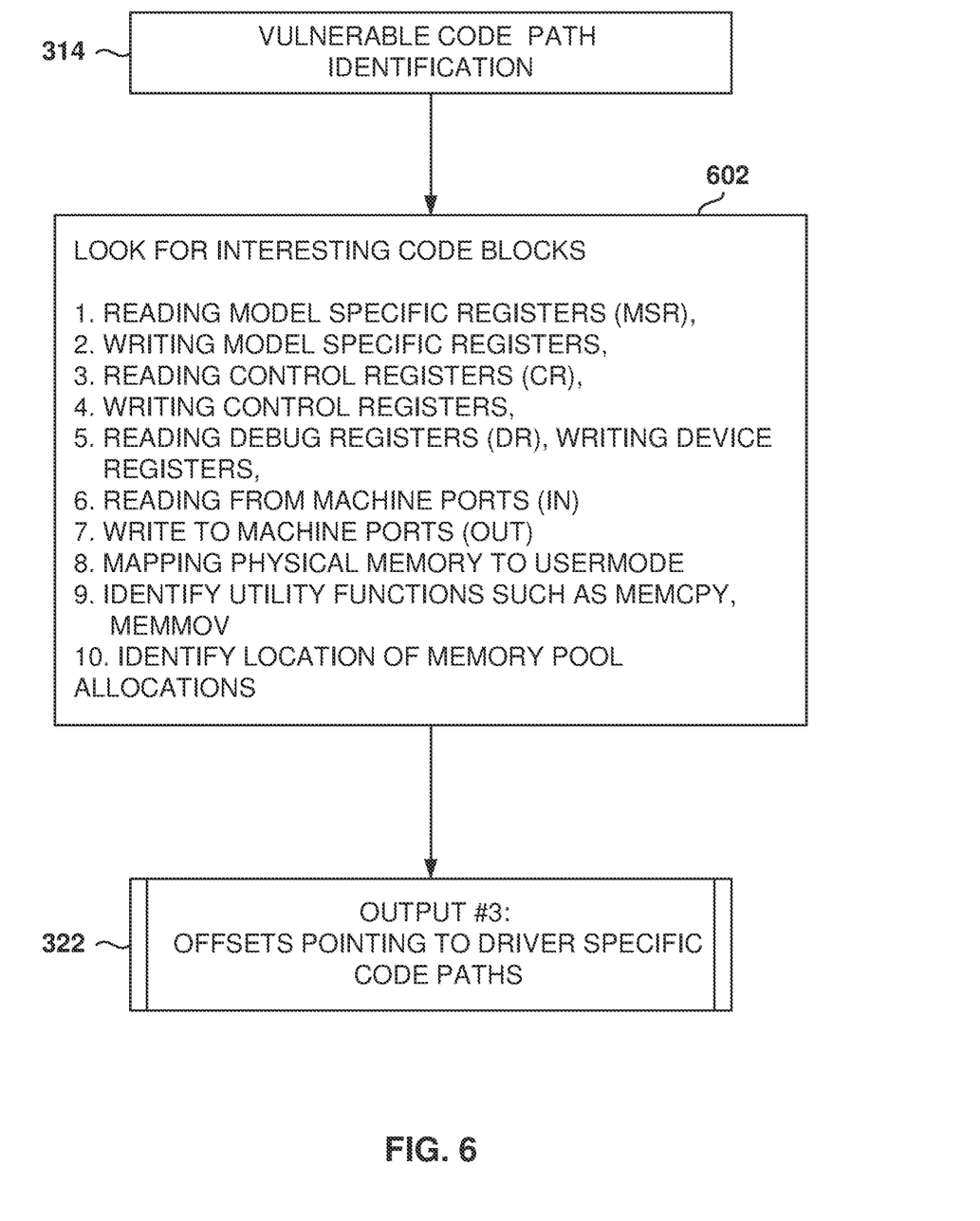
FIG. 6 is a flowchart detailing the vulnerable code path identification that is part of the static detection, according to some example embodiments.

FIG. 6 is a flowchart detailing the vulnerable code path identification 314 that is part of the static detection, according to some example embodiments.

As described above, the vulnerability detection identifies locations (e.g., one to ten locations typically), accessible by the user mode. When the user mode accesses the driver at a given offset, the driver parses the data provided by the user mode, and vulnerable code path identification 314 finds targets inside the driver functionality that are reachable from the identified handlers. That is, before, the sources of the drivers were identified, and now the possible destinations are identified. This way, it is possible to determine that the driver is vulnerable when the targets provide vulnerable access to unauthorized resources.

At operation 602, the vulnerability detection looks for "interesting" code blocks that may indicate a vulnerability. For example, look for access to the kernel mode by the driver, e.g., to read a machine specific register. The identification assesses whether the driver is trying to read registers arbitrarily, trying to read something sensitive, trying to write into a machine specific register, trying to read a controlled register, etc. Thus, "interesting" code blocks are those code blocks that, when executed, may access the kernel or areas of memory associated with the kernel or other OS critical functions.

Some examples of potentially vulnerable code blocks, that include suspicious and privileged functionality, are: reading model specific registers (MSR), writing model specific registers, reading control registers (CR), writing control registers (CR), reading debug registers (DR), writing debug registers, reading from machine Ports (IN), writing to machine Ports (OUT), mapping physical memory to user mode, identifying utility functions such as Memcpy and Memmov, and identifying the location of memory pool allocations.

The result of operation 602 is output #3 322 with the offsets of the driver pointing to driver-specific code paths.

Referring back to FIG. 3, once the offsets of the driver (output #2) and the reachable vulnerable paths (output #3) are obtained, at operation 318, the vulnerability detection determines if the offsets from output #3 can be reached from the offsets of output #2. This determines if the user mode may reach those special targets that access kernel functionality. That is, if it is possible for the user mode to supply parameters in such a way that the user mode can reach the output #3 targets from the driver-entry offsets of output #2.

If vulnerable code paths are identified, a score for vulnerability is assigned to the code paths, where the score for vulnerability indicates how vulnerable that code path is for malicious use by the user mode. Output #4 320 includes the vulnerable code paths and their respective vulnerability scores.

Further, at operation 324, the results from output #1 and from output #4 are combined to determine the driver vulnerabilities. That is, the scores from output #1 and output #4 are combined to obtain a combined vulnerability score for the code paths. The scores may be combined as a sum, a weighted sum, a multiplication, a maximum function, a minimum function, a polynomial function, etc., or a combination thereof.

For example, if the output #1 provides a high score for bad behavior potential, the vulnerability detection will determine that the driver is vulnerable. If the output #1 does not indicate vulnerability, the vulnerability detection will examine output #4 to determine if there are vulnerable path scores that will allow the user mode reach functional blocks that may be used for improper access to the kernel by the user mode.

In some example embodiments, the vulnerability detection returns all code paths with a vulnerability score exceeding a predetermined threshold value. Further, a determination is made on whether the driver is vulnerable based on the combined vulnerability score. For example, if the driver has a vulnerability score below a predetermined threshold, the driver is considered safe, and if the driver has a vulnerability score above or equal to the predetermined threshold, then the driver is considered vulnerable.

In some example embodiments, if the driver is already loaded in the computer system, the kernel may automatically disable the driver based on the vulnerability score. That is, if the vulnerability score is below a predetermined threshold, the kernel will make the driver inaccessible by other programs in the computer system, or the kernel may automatically delete or uninstall the driver from the computer system. These actions will make the computer system safer for users.

In other example embodiments, if the driver is determined unsafe based on the vulnerability score, the driver may be flagged as dangerous and reported to a central authority (e.g., OS services). This way, computer systems may check if the driver is known to be dangerous before the driver is loaded, and the driver will not be allowed to be loaded in the computer system if the driver has been flagged as dangerous or vulnerable.

One advantage of the vulnerability detection methods presented is the use of symbolic execution to detect and measure vulnerabilities without requiring prior driver-vulnerability information. The analysis of the binary code uses symbolic execution and emulation engines to detect all the functions, imports and APIs within the driver and correlate user mode data handlers with vulnerable code paths, specifically if the code paths are accessible from the handler's initiation. From there, the vulnerability detection can look for data that is accessed and executed from user mode. This design helps detect and measure vulnerable drivers, which can be accessed from user mode applications and that can be leveraged by adversaries to elevate their privileges when executing in the OS.

Figure 7:
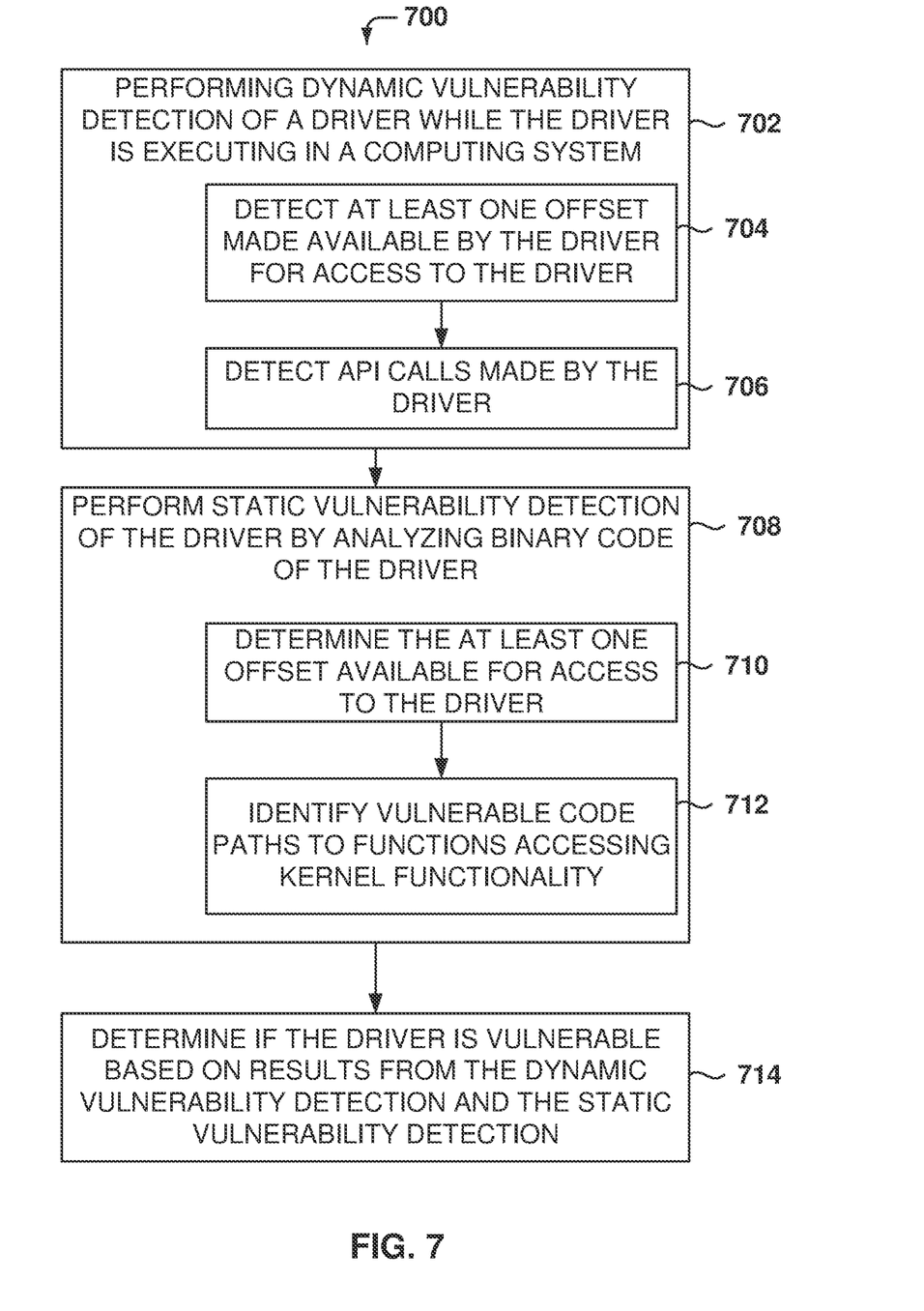
FIG. 7 is a flowchart of a method for analyzing a program to be executed on a computer to detect vulnerability for malicious attacks using the program, according to some example embodiments.

FIG. 7 is a flowchart of a method 700 for analyzing a program to be executed on a computer to detect vulnerability for malicious attacks using the program, according to some example embodiments.

Operation 702 is for performing dynamic vulnerability detection of a driver while the driver is executing in a computing system. See for example, the dynamic detection 302 method described with reference to FIG. 4. The dynamic vulnerability detection comprises operation 704 and 706.

Operation 704 is for detecting at least one offset made available by the driver for access to the driver, and operation 706 is for detecting application programming interface (API) calls made by the driver. In some example embodiments, the result of the dynamic detecting is output #1, which is a score for determining bad behavior potential of the driver when access from user mode.

From operation 704, the method 700 flows to operation 708 for performing static vulnerability detection of the driver by analyzing binary code of the driver. The static vulnerability is based on analyzing the binary code of the driver. For example, by performing the handler identification 312 method described with reference to FIG. 5, and the vulnerable code path identification 314 described with reference to FIG. 6. The static vulnerability detection comprises operations 710 and 712.

Operation 710 is for determining the at least one offset available for access to the driver, and operation 712 is for identifying vulnerable code paths to functions accessing kernel functionality.

From operation 708, the method 700 flows operation 714 for determining if the driver is vulnerable based on results from the dynamic vulnerability detection and the static vulnerability detection. The results from the dynamic and static detection are combined to discover vulnerable paths in the code to access kernel functionality from user mode.

If the driver is found vulnerable, the system may take several actions, such as disabling the driver in the computer system, uninstalling the driver, stopping the driver from being loaded in other computer systems, marking the driver vulnerable in a database containing driver information, etc., or a combination thereof.

In one example, the dynamic vulnerability detection comprises loading the driver on the computing system and accessing memory to read the at least one driver offset. Further, the dynamic vulnerability detection includes an operation for getting the at least one driver offset from driver metadata.

In one example, the dynamic vulnerability detection further comprises detonating the driver (e.g., executing the driver), and then detecting API calls made by the driver, such as a network API to perform network communications. This way, it is possible to detect if the driver may communicate over the network with a malicious user or for some other dangerous activity.

In one example, the method 700 further comprises calculating a first vulnerability score based on the API calls made by the driver, the existence of obfuscated code in the binary code of the driver, and the existence of a code pattern for malicious behavior. If the vulnerability score is above a predetermined threshold, the driver is considered vulnerable.

In one example, determining the at least one offset available for access to the driver comprises detecting API calls made by the driver detected in the binary code of the driver, analyzing the binary code of the driver using symbolic execution, analyzing the binary code of the driver using concolic execution, and detecting signature-based functions. See for example, the operations described with reference to FIG. 5.

In one example, determining the at least one offset available for access to the driver comprises calculating offsets in driver for user mode based on the detected API calls, the offsets identified by the symbolic execution, the offsets identified by the using concolic execution, and the offsets detected for signature-based functions.

In one example, analyzing the binary code of the driver using symbolic execution comprises parsing Windows Driver Framework (WDF) driver information, extracting table index from the WDF driver information, and identifying target function in the driver handling user mode request based on the extracted table index.

In one example, identifying vulnerable code paths detecting one or more of reading machine specific registers (MSR), writing machine specific registers (MSR), reading control registers (CR), writing control registers (CR), reading device registers (DR), writing device registers (DR), reading from machine Ports (IN), writing to machine Ports (OUT), mapping physical memory to user mode, identifying utility functions such as Memcpy and Memmov, and identifying locations of memory pool allocations.

In one example, the method 700 further comprises determining if the at least one offset available for access to the driver provide a path to a user mode to the functions accessing kernel functionality, and determining vulnerability scores for the vulnerable code paths. The vulnerability scores for the vulnerable code paths may be used to identify the driver as vulnerable.

In one example, the method 700 further comprises automatically disabling the driver in the computer system for access by other programs based on the vulnerability score.

Another general aspect is for a system that includes a memory comprising instructions and one or more computer processors. The instructions, when executed by the one or more computer processors, cause the one or more computer processors to perform operations comprising: performing dynamic vulnerability detection of a driver while the driver is executing in a computing system, the dynamic vulnerability detection comprising detecting offsets made available by the driver for access to the driver, and detecting application programming interface (API) calls made by the driver; performing static vulnerability detection of the driver by analyzing binary code of the driver, the static vulnerability detection comprising determining the offsets available for access to the driver, and identifying vulnerable code paths to functions accessing kernel functionality; and determining if the driver is vulnerable based on results from the dynamic vulnerability detection and the static vulnerability detection.

In yet another general aspect, a machine-readable storage medium (e.g., a non-transitory storage medium) includes instructions that, when executed by a machine, cause the machine to perform operations comprising: performing dynamic vulnerability detection of a driver while the driver is executing in a computing system, the dynamic vulnerability detection comprising detecting offsets made available by the driver for access to the driver, and detecting application programming interface (API) calls made by the driver; performing static vulnerability detection of the driver by analyzing binary code of the driver, the static vulnerability detection comprising determining the offsets available for access to the driver, and identifying vulnerable code paths to functions accessing kernel functionality; and determining if the driver is vulnerable based on results from the dynamic vulnerability detection and the static vulnerability detection.

Figure 8:
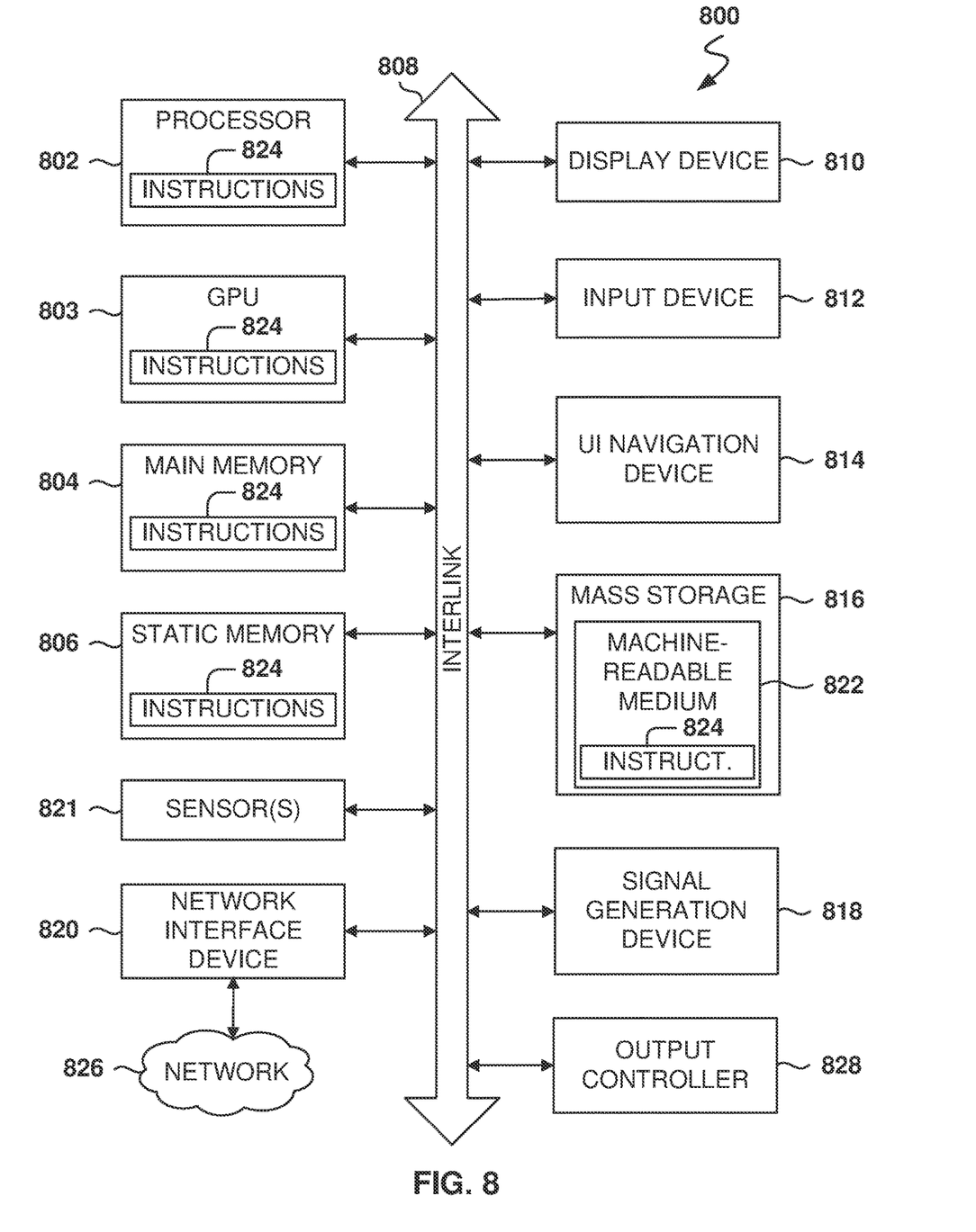
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
performing dynamic vulnerability detection of a driver while the driver is executing in a computing system, the dynamic vulnerability detection comprising:
detecting at least one offset made available by the driver for access to the driver; and
detecting application programming interface (API) calls made by the driver;
performing static vulnerability detection of the driver by analyzing binary code of the driver, the static vulnerability detection comprising:
determining the at least one offset available for access to the driver; and
identifying vulnerable code paths to functions accessing kernel functionality;
determining if the driver is vulnerable based on results from the dynamic vulnerability detection and the static vulnerability detection; and
automatically disabling the driver in the computer system for access by other programs based on the determining that the driver is vulnerable.

2. The method as recited in claim 1, wherein determining the at least one offset available for access to the driver comprises:
detecting API calls made by the driver detected in the binary code of the driver;
analyzing the binary code of the driver using symbolic execution;
analyzing the binary code of the driver using concolic execution; and
detecting signature-based functions.

3. The method as recited in claim 2, wherein determining the at least one offset available for access to the driver comprises:
calculating offsets in the driver for user mode based on the detected API calls made by the
driver detected in the binary code of the driver, offsets identified by the symbolic execution, offsets identified by the concolic execution, and offsets detected for signature-based functions.

4. The method as recited in claim 2, wherein analyzing the binary code of the driver using the symbolic execution comprises:
parsing Windows Driver Framework (WDF) driver information;
extracting table index from the WDF driver information; and
identifying target function in the driver handling user mode request based on the extracted table index.

5. The method as recited in claim 1, wherein identifying the vulnerable code paths detecting one or more of reading model specific registers (MSR), writing model specific registers, reading control registers (CR), writing control registers (CR), reading debug registers (DR), writing debug registers, reading from machine Ports (IN), writing to machine Ports (OUT), mapping physical memory to user mode, identifying memory utility functions, and identifying locations of memory pool allocations.

6. The method as recited in claim 1, further comprising:
determining if the at least one offset available for access to the driver provide a path to a user mode to the functions accessing kernel functionality; and
determining vulnerability scores for the vulnerable code paths.

7. A computer-implemented method comprising:
performing dynamic vulnerability detection of a driver while the driver is executing in a computing system, the dynamic vulnerability detection comprising:
loading the driver on the computing system;
accessing memory to read at least one offset;
detecting the at least one offset made available by the driver for access to the driver by getting the at least one offset from driver metadata; and
detecting application programming interface (API) calls made by the driver;
performing static vulnerability detection of the driver by analyzing binary code of the driver,
the static vulnerability detection comprising:
determining the at least one offset available for access to the driver; and
identifying vulnerable code paths to functions accessing kernel functionality; and
determining if the driver is vulnerable based on results from the dynamic vulnerability detection and the static vulnerability detection.

8. The method as recited in claim 7, wherein the dynamic vulnerability detection further comprises:
detonating the driver.

9. The method as recited in claim 8, further comprising:
calculating a first vulnerability score based on the API calls made by the driver, existence of obfuscated code in the binary code of the driver, and existence of a code pattern for malicious behavior.

10. A system comprising:
a memory comprising instructions; and
one or more computer processors, wherein the instructions, when executed by the one or more computer processors, cause the system to perform operations comprising:
performing dynamic vulnerability detection of a driver while the driver is executing in a computing system, the dynamic vulnerability detection comprising:
detecting at least one offset made available by the driver for access to the driver; and
detecting application programming interface (API) calls made by the driver;
performing static vulnerability detection of the driver by analyzing binary code of the driver, the static vulnerability detection comprising:
determining the at least one offset available for access to the driver; and
identifying vulnerable code paths to functions accessing kernel functionality; and
determining if the driver is vulnerable based on results from the dynamic vulnerability detection and the static vulnerability detection; and
automatically disabling the driver in the computer system for access by other programs based on the determining that the driver is vulnerable.

11. The system as recited in claim 10, wherein the dynamic vulnerability detection comprises:
loading the driver on the computing system;
accessing memory to read the at least one offset; and
getting the at least one offset from driver metadata.

12. The system as recited in claim 11, wherein the dynamic vulnerability detection further comprises:
   detonating the driver.

13. The system as recited in claim 12, wherein the instructions further cause the one or more computer processors to perform operations comprising:
   calculating a first vulnerability score based on the API calls made by the driver, existence of obfuscated code in the binary code of the driver, and existence of a code pattern for malicious behavior.

14. The system as recited in claim 10, wherein determining the at least one offset available for access to the driver comprises:
   detecting API calls made by the driver detected in the binary code of the driver;
   analyzing the binary code of the driver using symbolic execution;
   analyzing the binary code of the driver using concolic execution; and
   detecting signature-based functions.

15. A non-transitory machine-readable storage medium including instructions that, when executed by a machine, cause the machine to perform operations comprising:
   performing dynamic vulnerability detection of a driver while the driver is executing in a computing system, the dynamic vulnerability detection comprising:
      detecting at least one offset made available by the driver for access to the driver; and
      detecting application programming interface (API) calls made by the driver;
   performing static vulnerability detection of the driver by analyzing binary code of the driver,
      the static vulnerability detection comprising:
      determining the at least one offset available for access to the driver; and
      identifying vulnerable code paths to functions accessing kernel functionality; and
      determining if the driver is vulnerable based on results from the dynamic vulnerability detection and the static vulnerability detection; and
   automatically disabling the driver in the computer system for access by other programs based on the determining that the driver is vulnerable.

16. The non-transitory machine-readable storage medium as recited in claim 15, wherein the dynamic vulnerability detection comprises:
   loading the driver on the computing system;
   accessing memory to read the at least one offset; and
   getting the at least one offset from driver metadata.

17. The non-transitory machine-readable storage medium as recited in claim 16, wherein the dynamic vulnerability detection further comprises:
   detonating the driver.

18. The non-transitory machine-readable storage medium as recited in claim 17, wherein the machine further performs operations comprising:
   calculating a first vulnerability score based on the API calls made by the driver, existence of obfuscated code in the binary code of the driver, and existence of a code pattern for malicious behavior.

19. The non-transitory machine-readable storage medium as recited in claim 15, wherein determining the at least one offset available for access to the driver comprises:
   detecting API calls made by the driver detected in the binary code of the driver;
   analyzing the binary code of the driver using symbolic execution;
   analyzing the binary code of the driver using concolic execution; and
   detecting signature-based functions.

* * * * *